United States Patent [19]

Grawey

[11] 4,054,322
[45] Oct. 18, 1977

[54] RIM CONSTRUCTIONS
[75] Inventor: Charles E. Grawey, Peoria, Ill.
[73] Assignee: Caterpillar Tractor Co., Peoria, Ill.
[21] Appl. No.: 649,621
[22] Filed: Jan. 16, 1976

Related U.S. Application Data

[60] Continuation of Ser. No. 476,102, June 3, 1974, abandoned, which is a division of Ser. No. 402,268, Oct. 1, 1973, Pat. No. 3,877,504.

[51] Int. Cl.² ............................................. B60B 21/00
[52] U.S. Cl. ............................ 301/35 BJ; 301/63 D; 301/97
[58] Field of Search ............... 285/394, 396, 360, 361, 285/402; 301/63 D, 63 DS, 35 BJ, 97; 403/335, 349; 152/396–401, 412, 413

[56] References Cited
U.S. PATENT DOCUMENTS

| | | | |
|---|---|---|---|
| 974,897 | 11/1910 | Ljunggren | 285/396 X |
| 1,063,648 | 6/1913 | Broderick | 301/35 BJ |
| 1,293,015 | 2/1919 | Braucht | 301/35 BJ |
| 1,942,358 | 1/1934 | Grathwol | 285/396 X |
| 2,713,374 | 7/1955 | Fortuna | 152/412 |

Primary Examiner—Robert B. Reeves
Assistant Examiner—Joseph J. Rolla
Attorney, Agent, or Firm—Phillips, Moore, Weissenberger, Lempio & Majestic

[57] ABSTRACT

A rim for a pneumatic tire carcass has a pair of rim portions which are securable together to form such rim. One rim portion is integral with a wheel hub and includes a plurality of pockets or guide openings formed therein. The other rim portion includes guide members which correspond to these pockets and which are positionable therein to position the rim portions relative to each other. Apparatus for separating the rim portions with the tire carcass mounted on them is disclosed, as is apparatus for pulling the tire carcass off a rim portion after the other rim portion has been separated therefrom. In another embodiment, a pair of rim portions are assembled by positioning posts fixed on one rim portion into angled slots defined by the other rim portion, and rotating one rim portion relative to the other, the posts being drawn into the slots during such rotation to draw the rim portions together. In yet another embodiment, the tire carcass is supplied with an inner peripheral stiffener, which is seatable in a groove formed by a pair of fixed-together rimmed portions to center the tire carcass thereon. Also, another embodiment includes an annular plate and rim portions mounted in spaced relationship on either side thereof.

1 Claim, 25 Drawing Figures

Fig_19_

Fig_20_

RIM CONSTRUCTIONS

This is a continuation of Ser. No. 476,102, filed June 3, 1974, now abandoned, which is a division of Ser. No. 402,268, filed Oct. 1, 1973, now U.S. Pat. No. 3,877,504.

BACKGROUND OF THE INVENTION

This invention relates to rim constructions for mounting a pneumatic tire carcass, and more particularly to such rim constructions which are generally formed of two or more rim portions.

U.S. Pat. No. 3,606,921 issued to Grawey (assigned to the assignee of this application) discloses a novel, oval pneumatic tube-tire. A study of such patent reveals that, because of the particular configuration of such tube-tire, a rim used therewith must fulfill certain requirements which may not exist in the case of more conventional tires.

In general, rims for use with such a tube-tire may with advantage be of the split-rim type i.e., involving a pair of rim halves securable together to form such a rim. Such a rim structure is disclosed in U.S. application Ser. No. 283,375 now U.S. Pat. No. 3,802,744, also assigned to the assignee of this application.

While such a rim has proven to be extremely effective in use, it will be understood that a variety of rim configurations suitable for use with such tube-tire may be desired, each providing its own particular advantage, which may be of great use in the particular application of the tube-tire.

Of general interest in this area are U.S. Pat. No. 659,247 to Tillingnast, U.S. Pat. No. 1,320,999 to Baker, U.S. Pat. No. 1,595,335 to Atkins, U.S. Pat. No. 2,067,545 to Ricketts, Jr., U.S. Pat. No. 2,224,066 to Shore, U.S. Pat. No. 2,308,959 to Brink, U.S. Pat. No. 2,559,975 to Lange, et al., U.S. Pat. No. 2,713,373 to Daugherty, U.S. Pat. No. 2,720,240 to Bourdon, U.S. Pat. No. 2,860,683 to Smith, U.S. Pat. No. 3,047,041 to Bottasso, et al., U.S. Pat. No. 3,090,456 to Blenkle, U.S. Pat. No. 3,329,192 to Roque V, U.S. Pat. No. 3,597,001 to Morford, et al., U.S. Pat. No. 3,610,694 to Bradley, and German Pat. No. 1,176,013.

SUMMARY OF THE INVENTION

It is an object of this invention to provide rim constructions which are especially suitable for use with tube-type beadless tires such as those described in U.S. Pat. No. 3,606,921, mentioned above.

It is a further object of this invention to provide rim constructions which, while fulfilling the above object, are suitable for the intended use, meanwhile being relatively simple in construction and design.

Broadly stated, the invention comprises a rim assembly for a pneumatic tire carcass, comprising a first annular rim portion defining at least one guide pocket, and a second annular rim portion. A guide member in fixed to the second rim portion and positionable in the guide pocket to position the first and second rim portions relative to each other as they are brought together. Further included are removable means for fixing the so positioned first and second rim portions together, the rim portions when so fixed together forming a rim for the pneumatic tire carcass. Broadly stated, the invention further comprises a rim assembly for a pneumatic tire carcass comprising a first annular rim portion defining a plurality of angled slots, and a second annular rim portion. A plurality of posts are fixed to the second rim portion, and correspond to the angled slots. Such posts are positionable so that each post is disposed in a slot, the slots being angled so that rotation between the first and second rim portions in one direction draws the posts disposed in the slots more deeply into the slots and draws the first and second rim portions together. Means are included for selectively preventing rotative motion between the first and second rim portions upon drawing of the first and second rim portions together, so that the first and second rim portions are fixed together, the rim portions when so fixed together forming a rim for the pneumatic tire carcass. The invention still further comprises a rim assembly for seating and substantially centering a pressurized tire carcass of oval cross-section, comprising first and second annular rim portions, and means for securing the first and second rim portions together to form a rim for the pneumatic tire carcass. The first and second rim portions define first and second annular groove portions which lie adjacent each other to form an annular groove with the first and second rim portions so secured together. The tire carcass includes an inwardly extending annular portion at the inner periphery thereof and seated in the groove. Relatively stiff, substantially inextensible means are associated with the inwardly extending portion, which seat to an extent into the annular groove when the annular inwardly extending portion is so seated in the annular groove. The invention still further comprises a rim assembly for a pneumatic tire carcass comprising an annular plate, and first and second annular rim portions positionable on either side of the outer annular edge portion of the annular plate Means are included for securing the first and second rim portions to the annular plate when the first and second rim portions are so positioned, the first and second rim portions and annular plate defining a rim for the pneumatic tire carcass.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
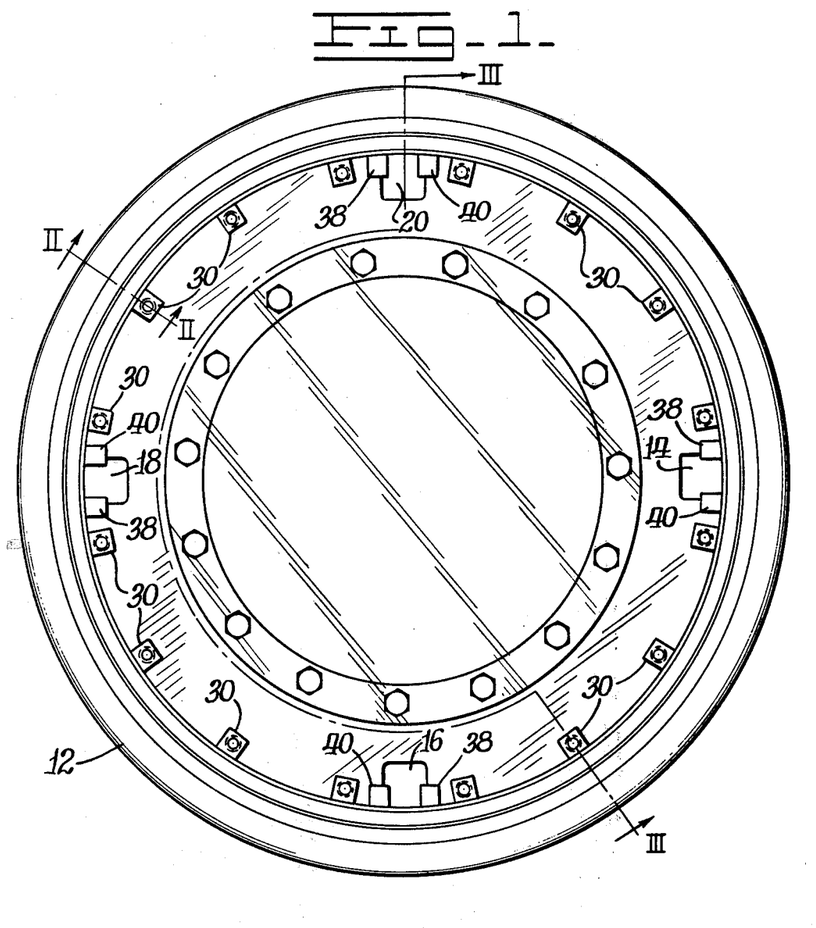
FIG. 1 is a side elevation of a rim portion of a first embodiment of rim assembly.
Figure 2:
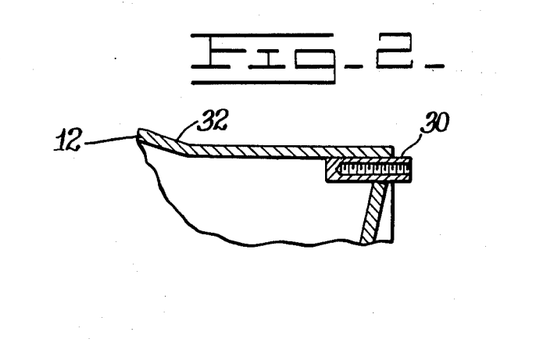
FIG. 2 is a sectional view taken along the line II—II of FIG. 1.
Figure 3:
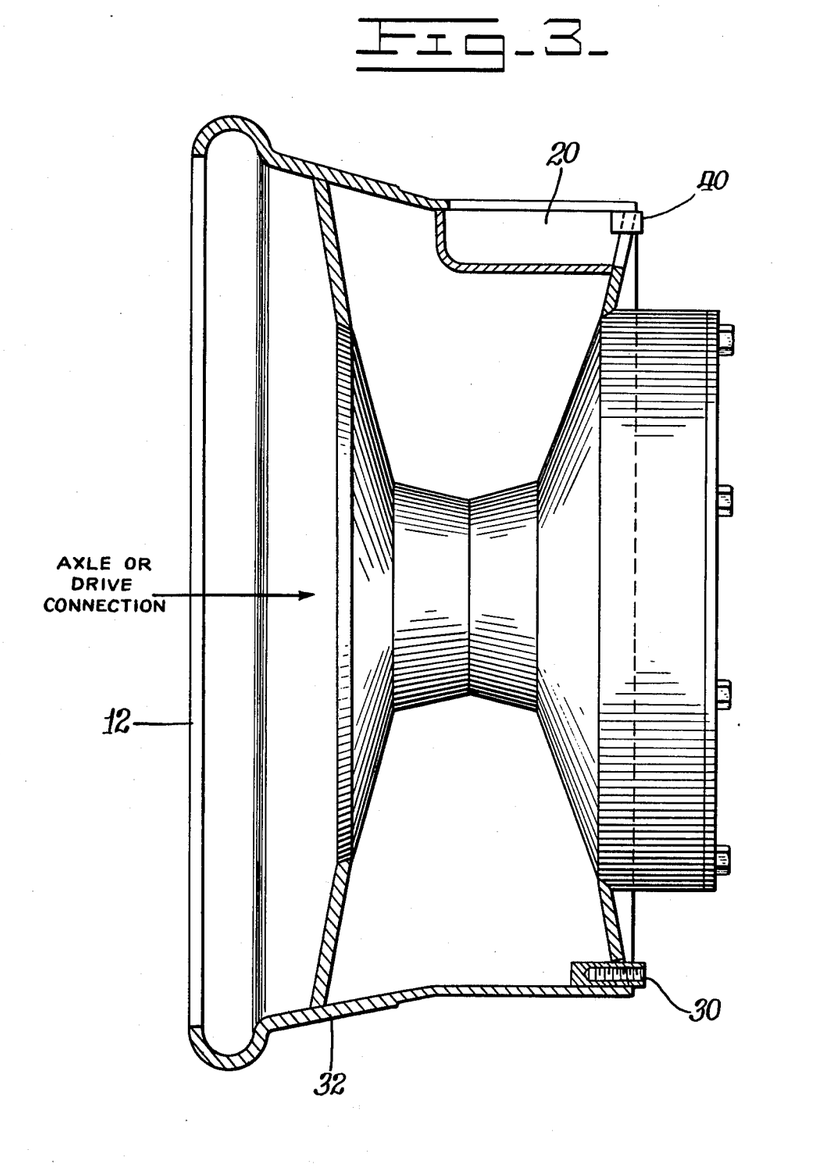
FIG. 3 is a sectional view taken along the line III—III of FIG. 1.
Figures 4, 5:
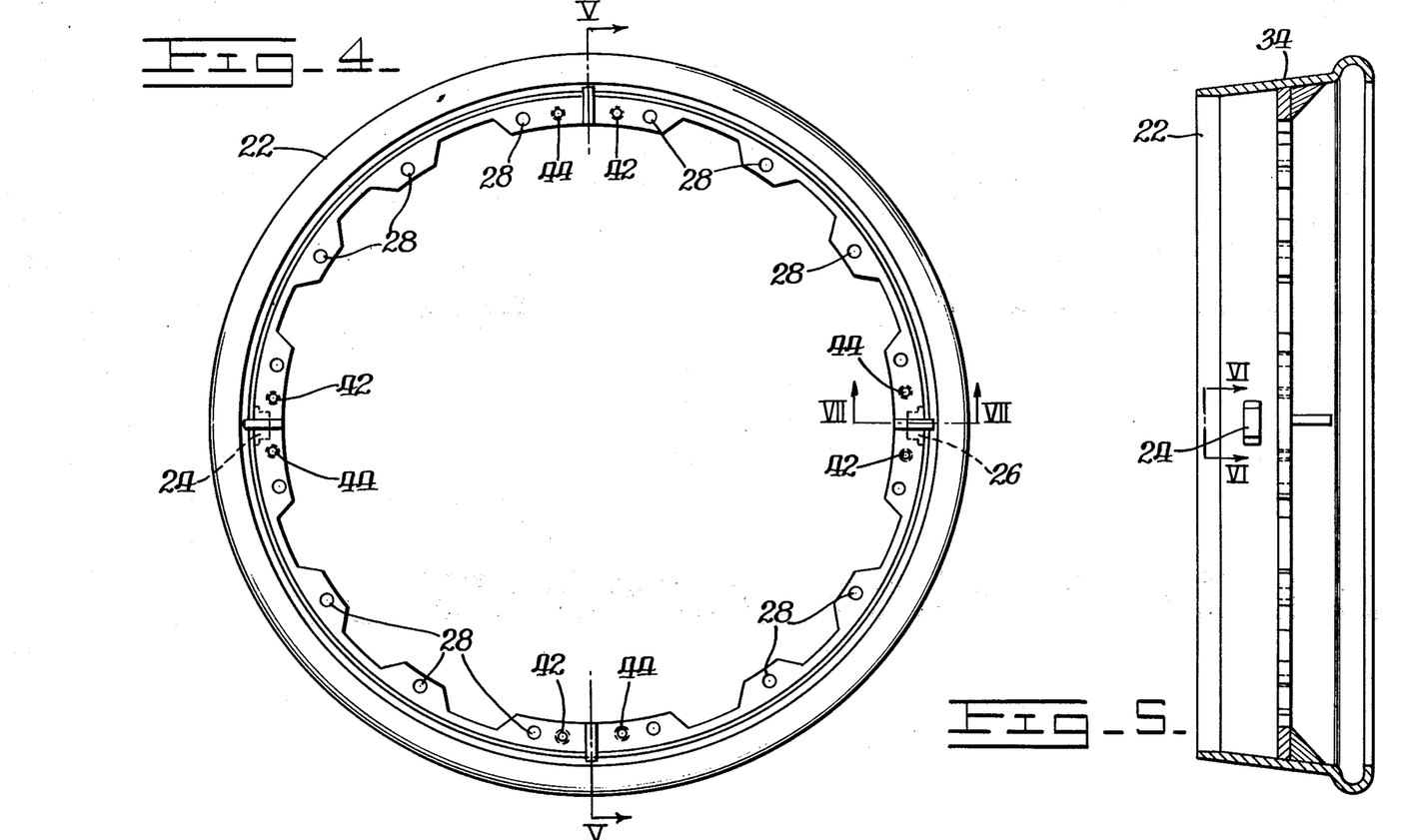
FIG. 4 is a side elevation of the other rim portion of the first embodiment of rim assembly.
FIG. 5 is a sectional view taken along the line V—V of FIG. 4.
Figure 6:
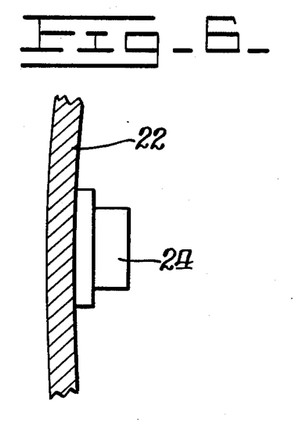
FIG. 6 is a sectional view taken along the line VI—VI of FIG. 5.
Figure 7:
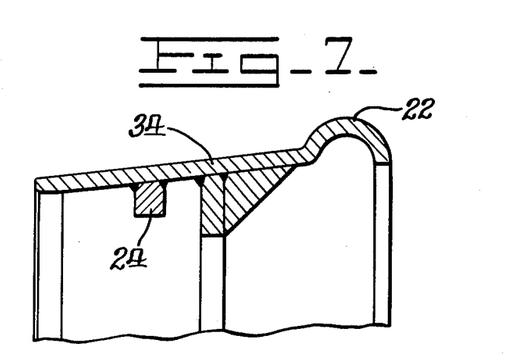
FIG. 7 is a sectional view aken along the line VII—VII of FIG. 4.

Reference is made to FIGS. 1-12, illustrating a first embodiment of rim assembly 10, and associated structure. Such rim assembly 10 includes an annular rim portion 12 as shown in FIGS. 1-3. The rim portion 12 defines pockets 14,16,18,20 spaced thereabout adjacent and inwardly of the outer periphery of the rim portion 12. The pockets 14,16,18,20 are spaced substantially 90° apart about the rim portion 12, i.e., the pockets 14,18 are substantially 180° apart, and the pockets 16,20 are substantially 180° apart. One of the pockets i.e., for example pocket 14, is used to house an air fitting for a pneumatic tire carcass which will be mounted on the rim.

FIGS. 4-7 show a second annular rim portion 22 which is used in association with the rim portion 12 to form such rim. The rim portion 22 has fixed thereto a pair of guide members 24,26 spaced substantially 180° apart adjacent and inward of the outer periphery of the rim portion 22.

The guide members 24,26 are positioned in the pockets 16,20 to position the rim portions 12,22 relative to each other as they are brought together. Thus, the pockets 16,20 act as guide pockets. Upon the rim portions 12,22 being brought together, a plurality of rim bolts are disposed through apertures 28 defined by the rim portion 22, and threaded into tubular members 30 (FIGS. 2 and 3) fixed to the rim portion 12, to bring the rim portions 12,22 readily together to form the rim.

Figure 8:
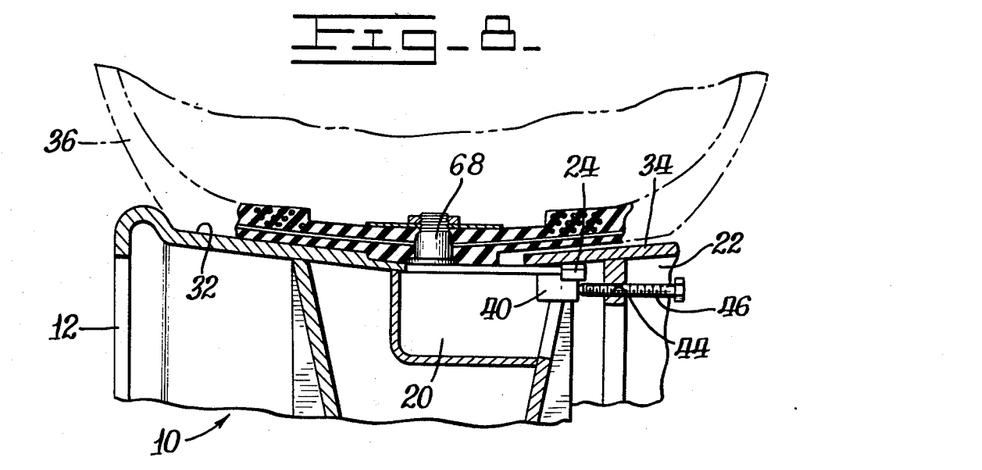
FIG. 8 is a sectional view of the first embodiment of rim assembly, showing the means for separating the rim portions.
Figure 9:
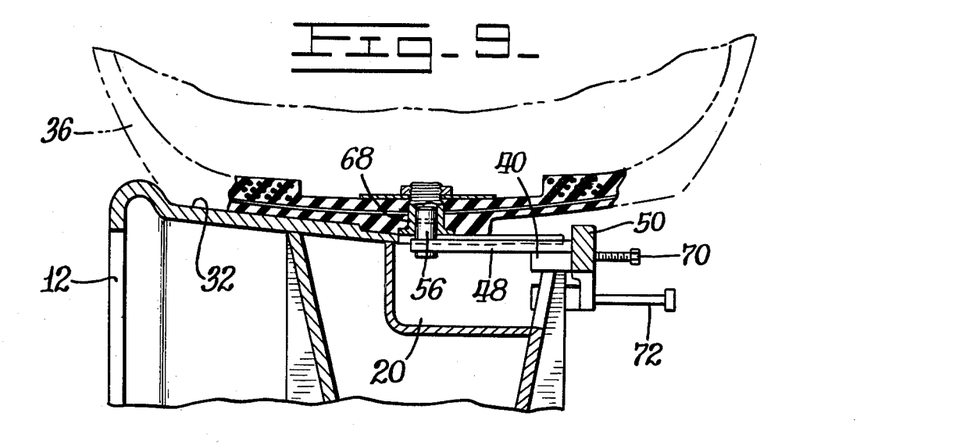
FIG. 9 is a sectional view similar to that of FIG. 8, but showing the means for removing the tire carcass from one of the rim portions.

The rim portions 12,22 define outer, conically-shaped surfaces 32,34 which have decreasing taper inwardly of the outer edges of the rim portions, and on which the tire carcass 36 is seated (FIG. 8). Thus, in order to normally assemble the rim, the tire carcass 36 is mounted on the rim portion 12, and rim portion 22 is applied and fitted thereto.

With the rim assembly 10 in such state as shown in FIG. 8, means are included for separating the rim portions 12,22 upon removal of the bolts holding these rim portions 12,22 together. Such means include a pair of force pads 38,40 fixed to the rim portion 12 adjacent each pocket. The rim portion 22 further defines threaded apertures 42,44 which are spaced to correspond to the force pads 36,40. Bolts 46 are threadably fitting to these apertures, and correspond to the force pads, being positioned so that upon rotation of these bolts 46 in one direction, the bolts 46 contact respective force pads 38,40 to urge the rim portions 12,22 apart.

Figures 10, 12:
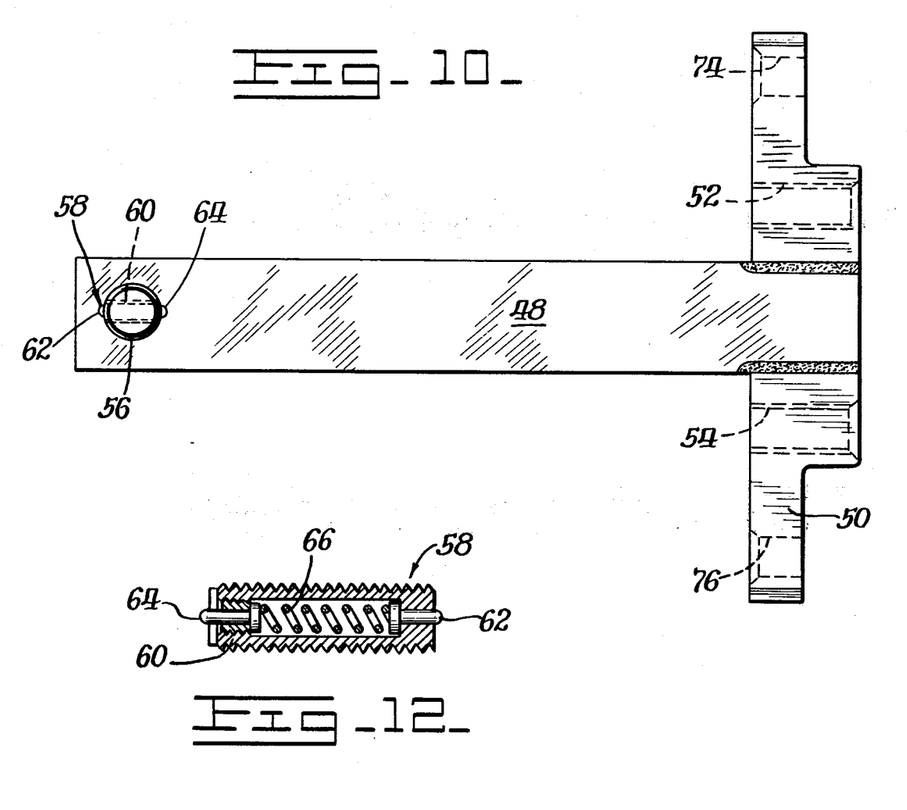
FIG. 10 is a plan view of the tire-removing means used as shown in FIG. 9.
FIG. 12 is a sectional view of the detent device associated with the tire-removal means of FIGS. 10 and 11.
Figure 11:
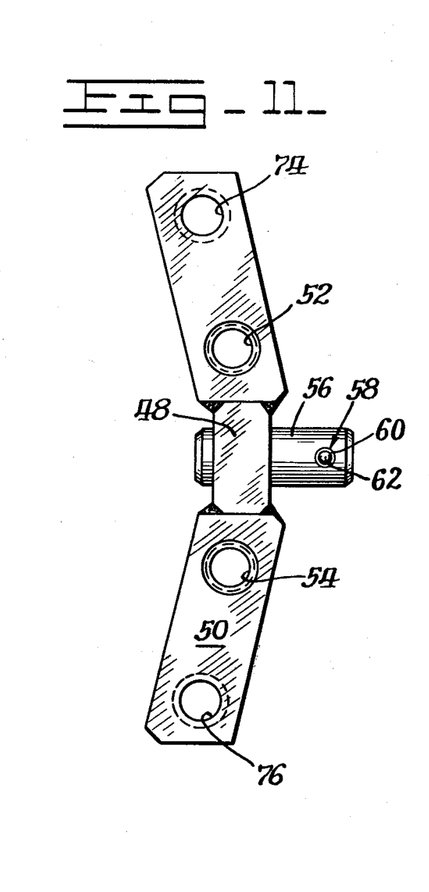
FIG. 11 is an end elevation of the tire-removal means as shown in FIG. 10.
Figure 13:
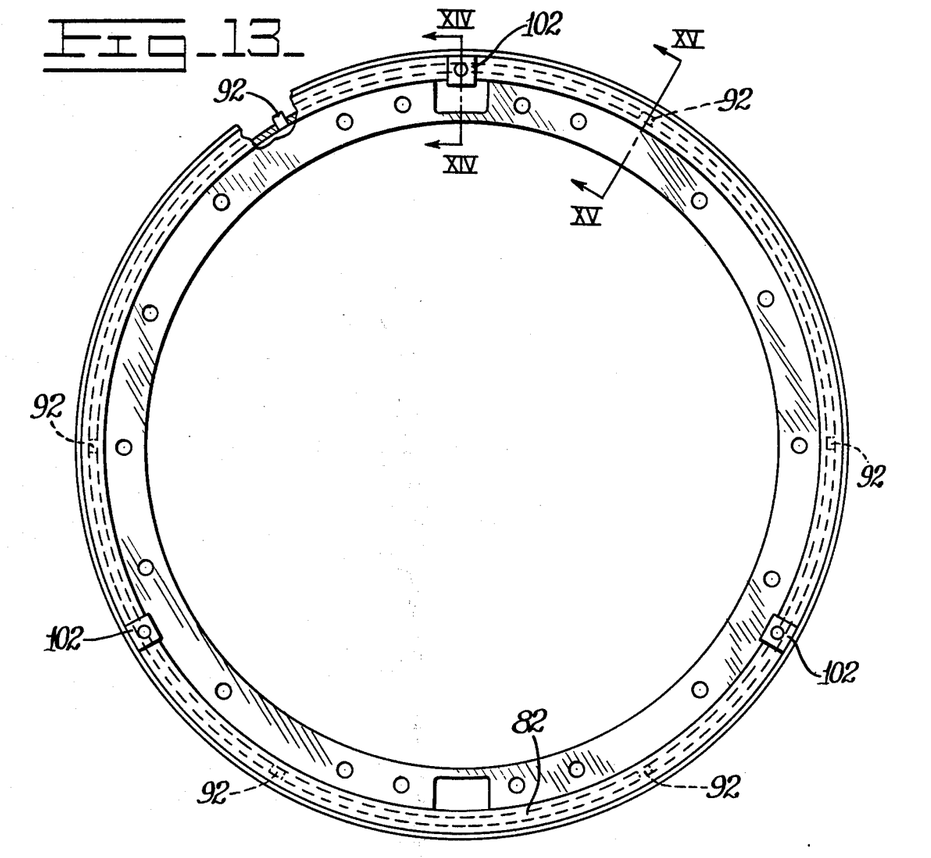
FIG. 13 is a side elevation of a rim portion of a second embodiment of rim assembly.
Figure 14:
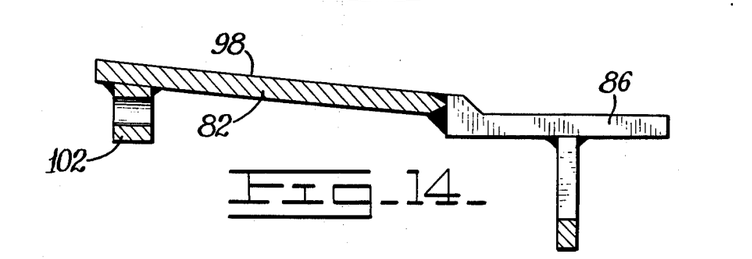
FIG. 14 is a sectional view taken along the line XIV—XIV of FIG. 13.
Figure 15:
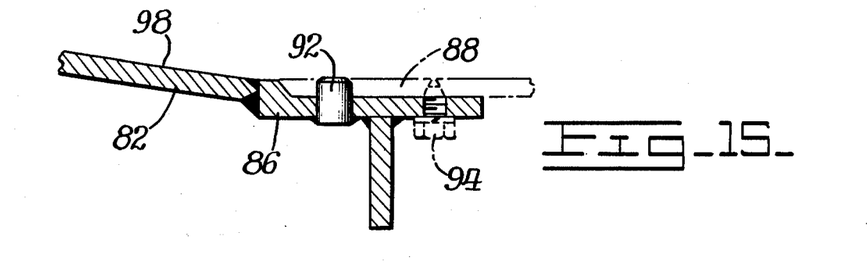
FIG. 15 is a sectional view taken along the line XV—XV of FIG. 13.
Figure 16:
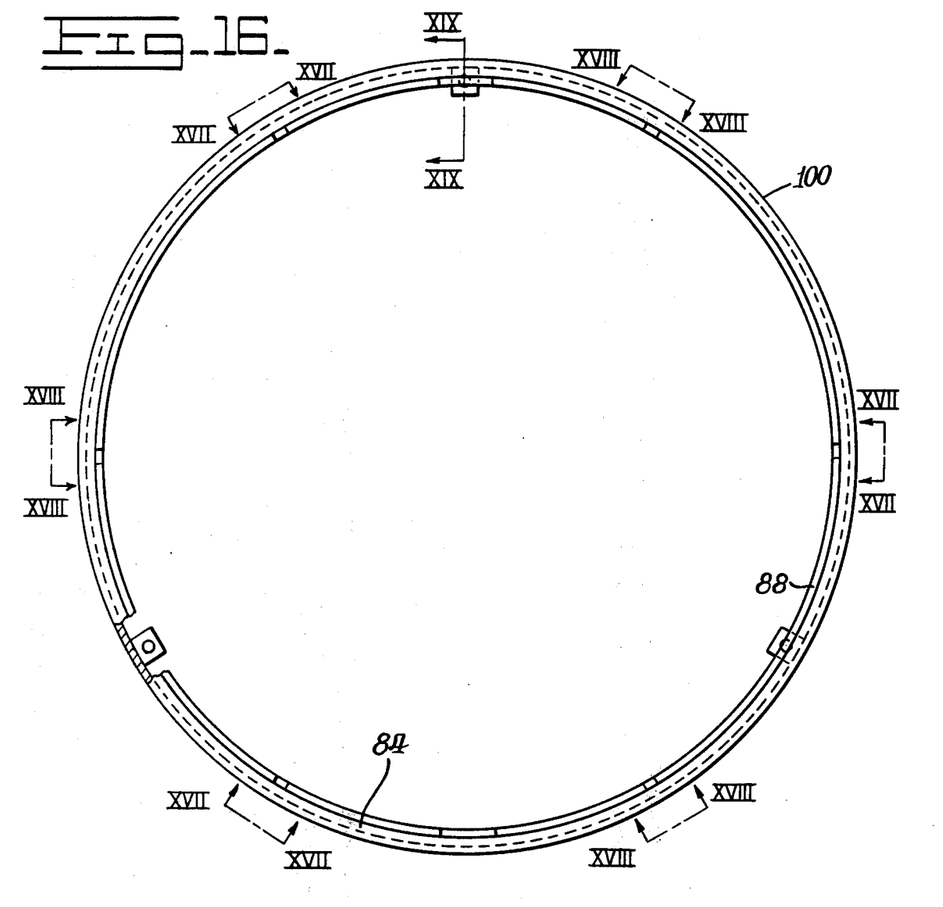
FIG. 16 is a side elevation of the other rim portion of the second embodiment of rim assembly.
Figure 17:
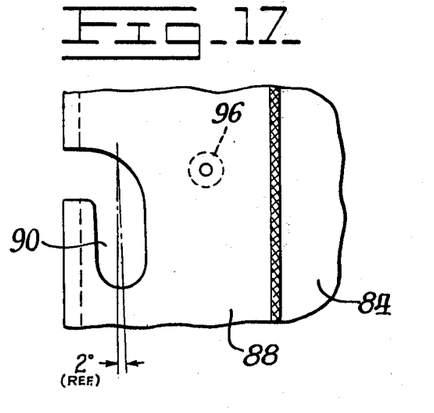
FIG. 17 is a view taken along any of the lines XVII—XVII of FIG. 16.

After separation of the rim portions 12,22 by such means, further means as shown in FIGS. 9-12 are included for removing a portion of the tire carcass 36 from the rim portion 12. Such means include a bar 48 having a cross block 50 fixed to the end thereof. The block 50 defines bores 52 and 54 threaded therethrough as shown. The opposite end of the bar has fixed thereto a detent post 56 which has threaded therethrough a detent mechanism 58 as shown in FIG. 12. This mechanism 58 includes a housing 60 in which pin members 62,64 are slidable, and held apart by a spring 66. Such pin members 62,64 protrude to an extent beyond the detent post 56. The detent post 56 is mounted in an insert 68 associated with the tire carcass 36, the pins 62,64 seating in depressions in the insert 68 to releasably hold the detent post 56 therein. The end of the bar 48 to which the detent post 56 is fixed of course extends into the pocket 20, the other end extending outwardly of the pocket 20 to adjacent the pair of force pads 38,40. A pair of puller bolts 70 are threaded through bores 52,54, corresponding to the force pads 38,40, and positioned so that upon rotation of the puller bolts 70 in one direction, the puller bolts 70 contact respective force pads 38,40 for applying force to the tire carcass 36 and pulling the tire carcass portion from the rim portion 12.

A pair of guide bolts 72 are inserted through apertures 74,76 in block 50 and threaded into tubular members 50 to guide the block 50 and bar 48 as they are being moved by the turning of bolts 70.

Figure 18:
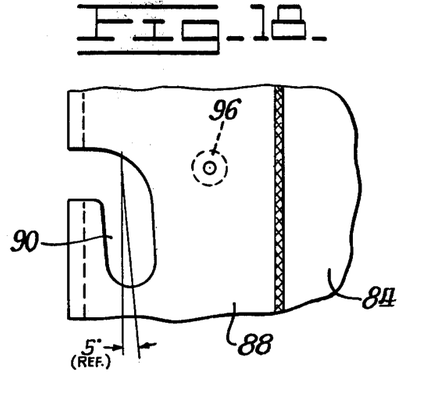
FIG. 18 is a view taken along any of the lines XVIII—XVIII of FIG 16.
Figure 19:
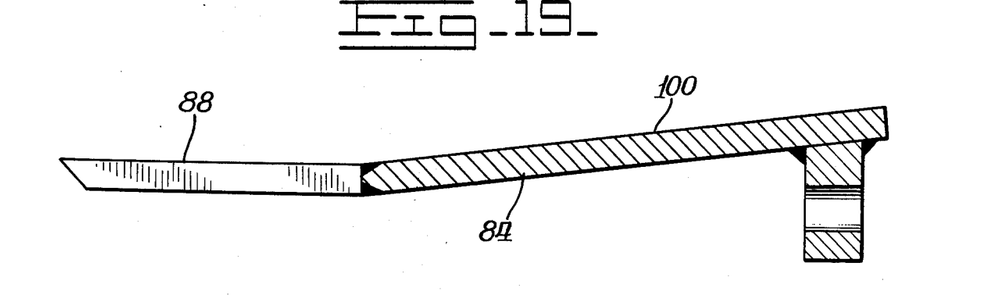
FIG. 19 is a sectional view taken along the line XIX—XIX of FIG. 16.
Figure 20:
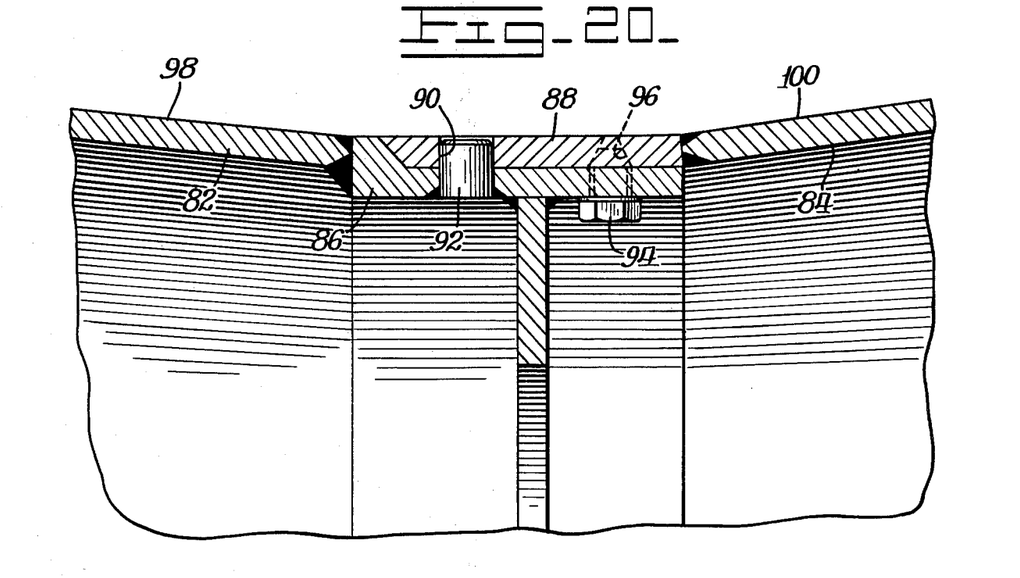
FIG. 20 is a sectional view showing the rim portions of the second embodiment joined together.

Shown in FIGS. 13-20 is a second embodiment of rim assembly 80 for a pneumatic tire carcass. The rim assembly 80 includes annular rim portions 82,84. The rim portion 82 defines a cylindrical portion 86, and the rim portion 84 also defines a cylindrical portion 88, the inner diameter of the cylindrical portion 88, being slightly larger than the outer diameter of the cylindrical portion 86. The cylindrical portion 88 of the rim portion 84 defines six angled slots 90 thereabout. at substantially 60° intervals thereabout. The cylindrical portion 86 has fixed thereto six posts 92, at substantially 60° intervals, corresponding to the placement of the angled slots 90. Each post 92 is positioned in a slot 90, it will be seen, and the slots 90 are angled so that relative rotation between the rim portions 82,84 in one direction draws the posts 92 more deeply into the slots 90 to draw the rim portions 82,84 together. A plurality of set screws 94 are then disposed through threaded apertures in the cylindrical portion 86, and the tips thereof are seatable in depressions 96 in the cylindrical portion 88 to prevent the rotative motion between the rim portions 82,84. Three slots 90 spaced 120° apart are angled at substantially 2° (FIG. 17), and three slots 90 spaced 120° apart are substantially at 5° (FIG. 18). These slots 90 are positioned in relation to each other so that the 2° angled slots provide initial drawing together of the rim portions 82,84, and the 5° angled slots provide later drawing together of the rim portions 82,84, as such relative rotative motion between the rim portions 82,84 takes place, resulting in progressive drawing action upon such relative rotation.

The rim portions 82,84 define outer conically-shaped portions 98,100 having decreasing taper inward of the outer edges of the rim, and on which the tire carcass is seatable.

Three tabs 102 are fixed to the rim portion 82 to allow this rim portion to be held on a fixture if so desired as the other mating rim portion 84 is rotated into locking position.

Figure 21:
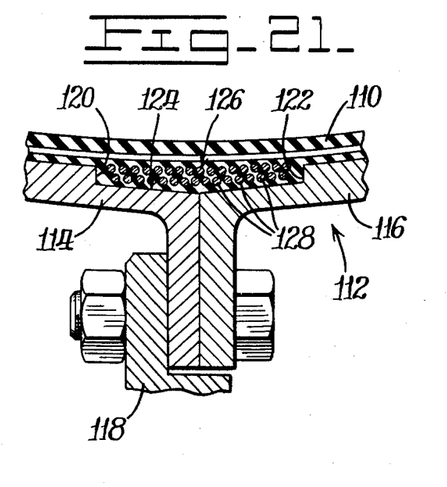
FIGS. 21-24 are sectional views of variations of a third embodiment of rim assembly.

In FIGS. 21-24 are shown various types of rim assemblies which provide for seating and substantially centering a tire carcass 110 of oval cross-section. In FIG. 21, the rim assembly 112 is made up of annular rim portions 114,116 fixed to a plate 118. The rim portions 114,116 define annular groove portions 120,122 which are adjacent each other with the rim portions 114,116 brought together to form an annular groove 124 with the rim portions 114,116 so secured together. The tire carcass 110 includes an inwardly extending annular portion 126 at the inner periphery thereof, and seatable in the groove 124. In this design, relatively stiff, substantially inextensible metal wire wrap 128 is included in the inwardly extending annular portion 126. Such wire wrap 128 also seats to an extent in the annular groove 124 when the inwardly extending annular portion 126 is so seated in the annular groove 124.

Figure 22:
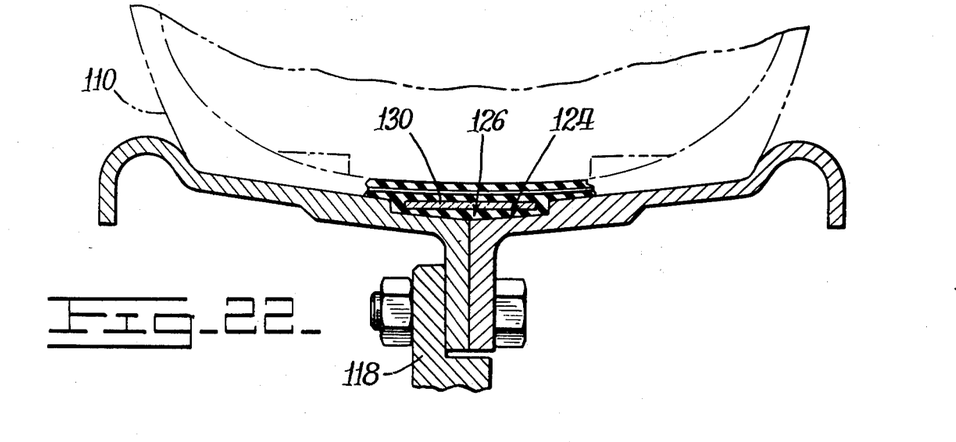

The design of FIG. 22 if similar to that of FIG. 21, but with the substitution of substantially flat, elongated plate means 130 for the wire wrap 128. The plate means 130 may with advantage be a plurality of metal members embedded in the inwardly extending annular portion 126.

Figure 23:
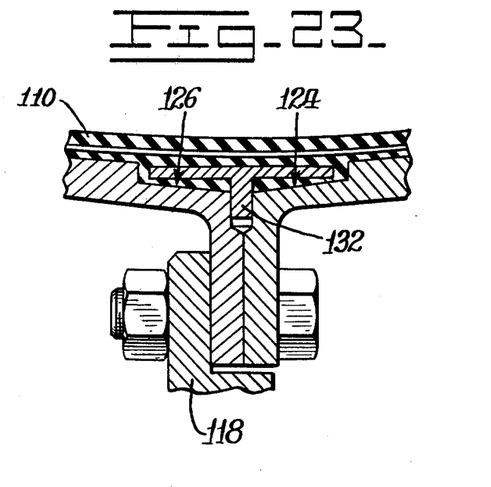

FIG. 23 shows yet another design of this type. As shown therein, the plurality of metal members 132 are of T-shaped cross-section, each member 132 being partially embedded in the inwardly extending annular portion 126, and having a portion extending therefrom and in contact with the rim. Such contact provides means for dissipating heat from the tire during operation thereof.

Figure 24:
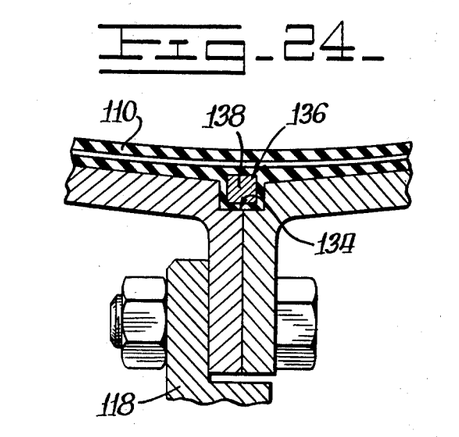

FIG. 24 shows yet another design of this type. In such FIG. 24, the groove 134 is much smaller in cross-section than in the previous embodiments, as is the inwardly extending annular portion 136 which seats therein. A plurality of metal members 138 are embedded in such portion 136 as shown, these being of generally square cross-section as shown.

In each embodiment, the rim portions define outer conically-shaped surfaces having decreasing tapers inwardly of the outer edges of the rim and toward the groove thereof, on which the tire carcass 110 is seated.

Figure 25:
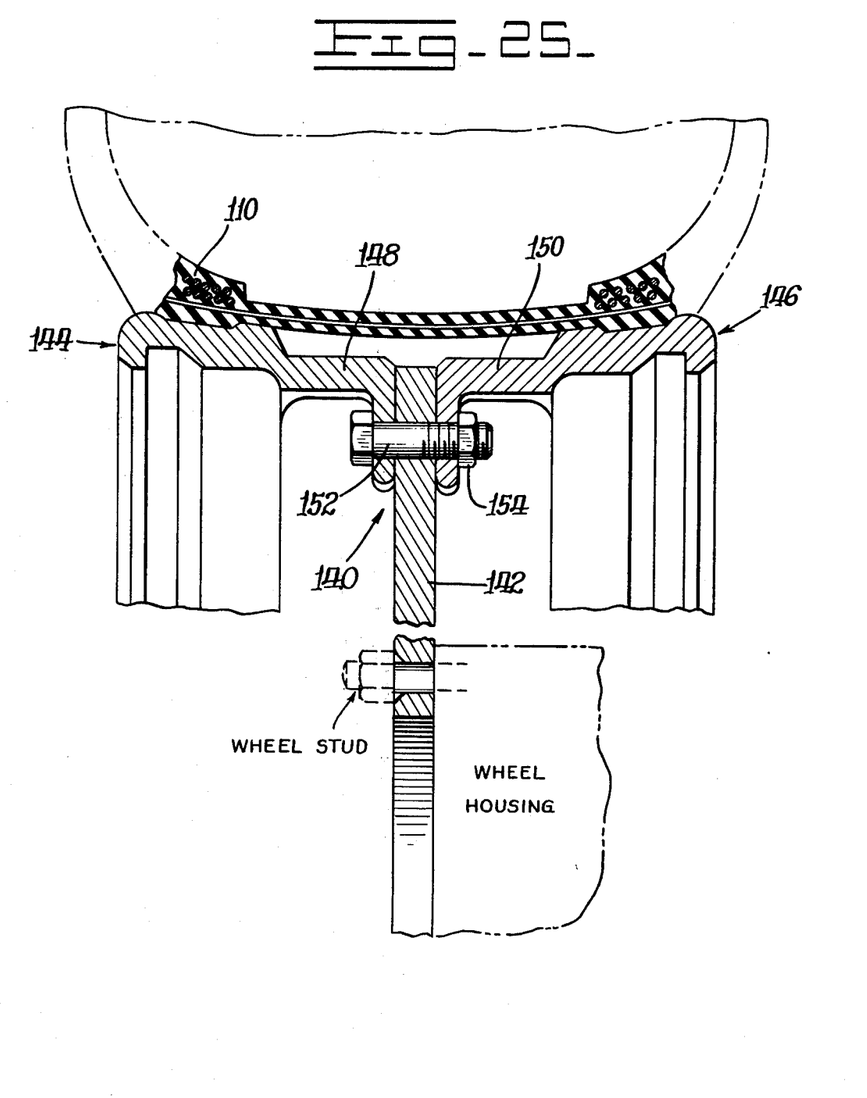
FIG. 25 is a sectional view of a fourth embodiment of rim assembly.

In FIG. 25 is shown another embodiment of rim assembly 140. Such rim assembly includes an annular plate 142, and annular rim portions 144, 146 positionable in spaced relationship on either side of the annular plate 142. A plurality of tap members 148 are fixed to the rim portion 144, and are positionable along the outer annular edge portion of the annular plate 142 with the rim portion 144 so positioned. A plurality of tab members 150 are fixed to the rim portion 146, and are positionable along the outer annular edge portion of the annular plate 142 with the rim portion 146 so positioned. A plurality of securing bolt means are included for securing the tab members 148, 150 to the annular plate 142 as shown. Such securing bolt means comprise a plurality of securing bolts 152, each disposed through an aperture in a tab member 148, an aperture in the annular plate 142, and an aperture in a tab member 150. Nuts 154 are threaded onto these securing bolts 152 and tightened to complete the rim assembly 140.

What is claimed is:

1. A rim assembly for a pneumatic tire carcass comprising:
   a first annular rim portion defining a plurality of angled slots;
   a second annular rim portion;
   a plurality of posts fixed to the second rim portion, and corresponding to the angled slots and positionable so that each post is disposed in a slot, the slots being angled so that rotation between the first and second rim portions in one direction draws the post disposed in the slots more deeply into the slots and draws the first and second rim portions together;
   some of the angled slots being angled at variance with the remaining angled slots so that the initial drawing together of the first and second rim portions takes place at a rate slower than subsequent drawing together of the first and second rim portions upon relative rotation thereof.

* * * * *